UNITED STATES PATENT OFFICE.

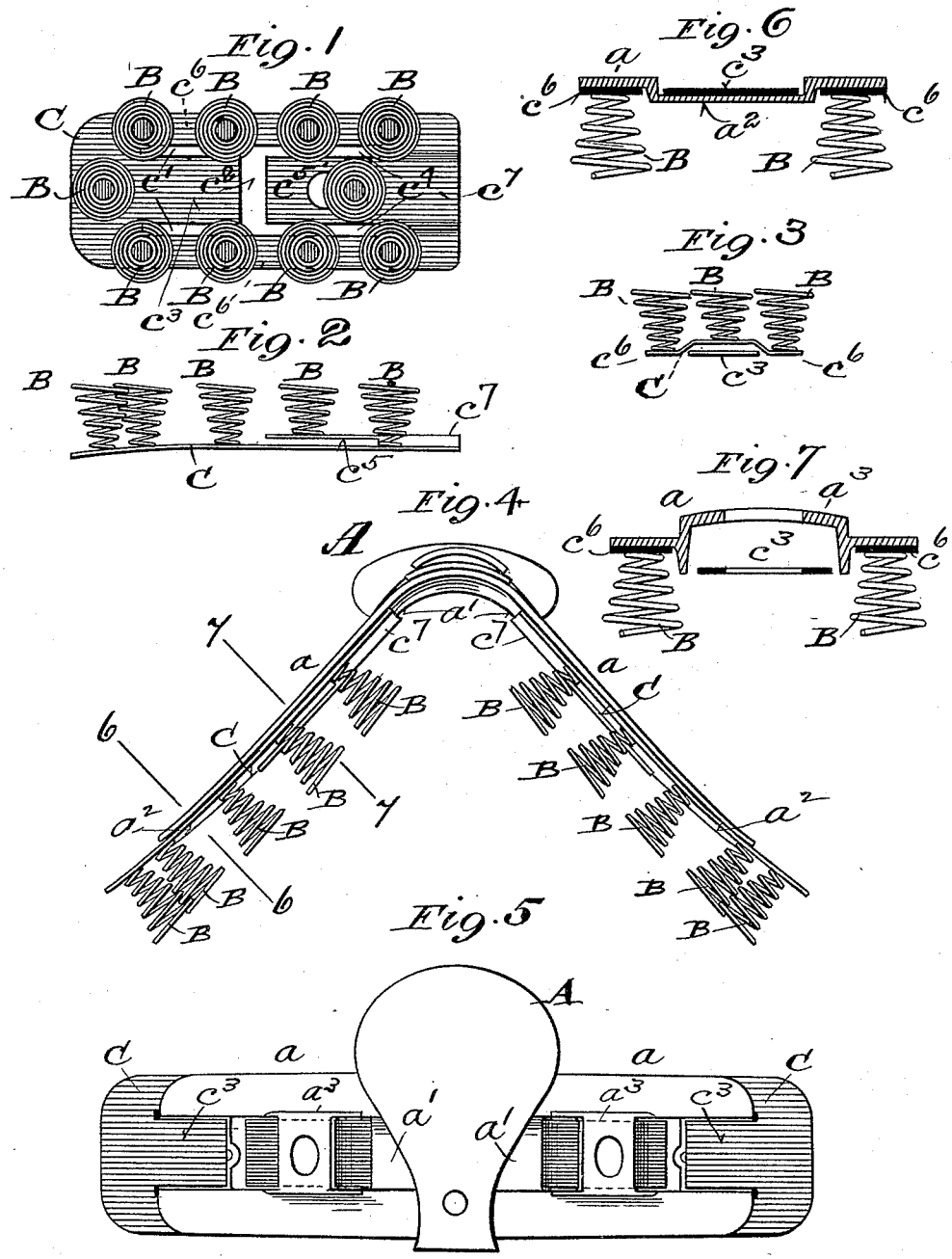

WILLIAM O. THAYER AND GUSTAVE F. WITTKOPF, OF ST. LOUIS, MISSOURI, ASSIGNOR TO G. F. WITTKOPF & CO., OF SAME PLACE.

HARNESS-SADDLE.

SPECIFICATION forming part of Letters Patent No. 462,176, dated October 27, 1891.

Application filed November 1, 1890. Serial No. 370,052. (No model.)

*To all whom it may concern:*

Be it known that we, WILLIAM O. THAYER and GUSTAVE F. WITTKOPF, both of St. Louis, Missouri, have jointly made a new and useful Improvement in Harness-Saddles, of which the following is a full, clear, and exact description.

The improvement relates to the improved means whereby a harness-saddle may be cushioned and adapted for use.

It consists, mainly, in providing the saddle-tree at each side thereof with a system of springs, by means of which the saddle is not only rendered quite elastic, but also accommodable to horses of various forms, substantially as is hereinafter described and claimed, aided by the annexed drawings, making part of this specification, in which—

Figure 1 is a bottom view of the attachment which I preferably use in carrying out the improvement, and which in use is applied to each side bar of the saddle-tree; Fig. 2, a side elevation thereof; Fig. 3, an inner end elevation thereof; Fig. 4, a front elevation of the saddle-tree equipped with the described attachments; Fig. 5, a plan of the same; Fig. 6, a cross-section on the line 6 6 of Fig. 4; and Fig. 7 a cross-section on the line 7 7 of Fig. 4.

The same letters of reference denote the same parts.

The saddle-tree A is of the ordinary form. B B B, &c., represent the series of springs which are applied to each side bar $a\ a$ of the saddle-tree. The springs are preferably of the helical form shown. In place of attaching the springs directly to the saddle-tree, I prefer to attach them to a plate C, which in turn is attachable to the saddle-tree. To this end the plate referred to is constructed so that it having the springs secured to it can be slipped onto the side bar of the saddle-tree and into a proper position thereon, substantially as shown, to enable the desired object to be attained. This is accomplished readily by slitting the plate at various places $c'\ c'\ c^2$ to form the tongue $c^3$ and at $c^4\ c^4$ to form another tongue $c^5$. The first-named tongue is substantially in the same plane with the side portions $c^6\ c^6$ of the plate. The last-named tongue, together with the end portion $c^7$ of the plate, is depressed, substantially as shown. The springs are secured to the plate by any suitable method, and mainly to the border portion thereof, substantially as shown. The plate is secured to the saddle-tree bar as follows: It is slipped endwise onto the bar, the described depressed portion of the plate and the tongue $c^5$ coming against the under side of the depressed portion $a'$ of the bar and the other tongue $c^3$ passing above a depressed portion $a^2$ at the lower outer end of the bar, substantially as shown in Figs. 4, 5, and 6. The engagement of the last-named tongue in the manner described with the saddle-tree bar serves to measurably unite the plate with the bar. If desired, the plate can be more firmly fastened to the bar by means of suitable rivets $c^8\ c^8$. After the described attachments have been secured to the tree the saddle is finished in the ordinary manner, saving that a large portion of a padding heretofore used may be dispensed with. It does not seem essential to illustrate this last-mentioned work. The improvement is adaptable to the ordinary forms of harness-saddles, and it is capable, as seen, of being applied without requiring the saddle-tree to be altered in any particular. The saddle-tree is usually a rigid piece of metal. It thus forms an excellent base for a system of springs, such as described, as thereby the springs at the outer portion thereof can be held firmly in place, while at the inner portion thereof they can be left comparatively free to act more or less independently of each other and to suit the variances occurring in the backs of horses. As a consequence of this, the improvement is especially adapted, as we have practically demonstrated, to a horse having a tender back, and a saddle having the present improvement embodied therein can be used successfully upon a back that has been irritated. By making the improvement in the form shown it can be made an article of commerce which can be, as seen, applied to the ordinary saddle-tree without requiring that part to be changed and without materially, if at all, increasing the cost of the saddle.

$a^3$ $a^3$ are the terret-supports.

We claim—

The combination, with the saddle-tree, of the series of springs connected to a plate having longitudinal tongues, one engaging the upper surface and the other engaging the lower surface of the saddle-tree, substantially as set forth.

Witness our hands this 28th day of October, 1890.

WILLIAM O. THAYER.
GUSTAVE F. WITTKOPF.

Witnesses:
C. D. MOODY,
A. BONVILLE.